United States Patent Office 2,870,122
Patented Jan. 20, 1959

2,870,122

MODIFIED AMINOPLAST RESIN COMPLEXES AND PROCESSES FOR PRODUCING THEM

Lucien Sellet, Saddle River, N. J., assignor to Jacques Wolf & Co., a corporation of New Jersey No Drawing. Application November 14, 1952
Serial No. 321,491

21 Claims. (Cl. 260—69)

The present invention relates to novel high molecular weight modified aminoplast resin complexes and to the process of producing them, said complexes having particular importance in the leather industry.

An object of my invention is to provide novel modified aminoplast resin complexes having a high affinity for solid materials colloidal in nature as raw animal hides.

Another object of my invention is to provide novel modified aminoplast resin complexes which act as tanning agents for a raw hide treated in a bath containing one of said complexes and which impart a high shrinkage temperature and water resistance to the treated hide as well as a fullness and light resistance to said hide.

Another object of my invention is to provide novel aminoplast resin complexes which quickly penetrate a raw hide when treated with a water bath containing one of said complexes.

A still further object of my invention is to provide novel aminoplast resin complexes which have tanning properties and become strongly fixed to a hide when treated in a water bath containing one of said complexes.

Another object of my invention is to provide novel aminoplast resin complexes which are highly stable in water solutions and will not polymerize on standing.

A still further object of my invention is to produce novel modified aminoplast resin complexes which are particularly useful as tannages in producing white leather.

Chrome tanning salts are not entirely satisfactory, for they have a low water resistance and tend to be washed from the hide. Also, they impart a low shrink temperature to the hide. Natural tanning agents such as quebracho also have these same deficient properties. Many of the retanning agents which are used for imparting a fullness to the hide after they have been treated with a tanning agent are not entirely satisfactory in that they are somewhat unstable in water solution and tend to polymerize. Also, in many cases they deleteriously affect the tensile strength of the leather by weakening the fibers. Furthermore, there are many cases susceptible of being washed out of the leather formed from the treated hide.

In order to provide a composition which is both a tanning agent, in that it imparts a high shrink temperature and water resistance to the treated hide, and at the same time act as a retanning agent, in that it imparts a fullness to the treated hide, I have invented the modified aminoplast complexes of the present invention. My novel complexes are advantageously highly stable in water solution and will not polymerize to form undesirable polymers. Furthermore, they are not only harmless to the fibers of the hide, but on the contrary, increase the tensile strength of the hide. Also, the complexes of the present invention become so strongly fixed to hide, they will not be washed out of it.

The modified aminoplast resin complexes are particularly useful in preparing white leather as they impart a whiteness to the leather which is far superior to that produced by any combination of the known tanning and retanning agents.

In general, the modified aminoplast resin complexes are prepared in the following manner: In the first stage, dicyandiamide is reacted with a water soluble mono or polycarboxylic acid at elevated temperatures for a suitable period of time at normal atmospheric pressure and usually in the presence of water. In the second or next stage, the resulting product from stage 1 is then condensed with formaldehyde or a formaldehyde liberating material at elevated temperatures for a suitable period of time at normal atmospheric pressures. In the final or third stage, the reaction product of stage two is reacted with an organic acid or mineral acid polyvalent metal salt at suitable temperature for a suitable period of time until a desired aminoplast resin complex of the present invention is formed.

A preferred step of the process although not a critical one, is to react the resulting product of stage two with a sulfo compound prior to the reaction in stage three. The sulfo compounds reacted are of the type illustrated by water soluble metal salts of alkyl substituted sulfonates such as the alkanol sulfonates and alkylamine sulfonates, as well as compounds which when reacted with a methylol group form alkanol amines wherein one hydrogen of said amine has been replaced by a sulfo group. By introducing one of these sulfo compounds prior to the final reaction stage, an advantage is believed to be obtained for it appears that in the final stage the heavy metal salts can form metal derivatives of both functional groups, that is the methylol and sulfo groups, whereby the aminoplast complex formed acts as vehicle in carrying the metal into the hide substance when treated with said complex.

The theory of the action of the modified aminoplast resin complexes of the present invention, whether prepared in the ordinary manner by the above referred to three-stage process or by the preferred method of introducing a sulfo compound to react with the product of stage two prior to final stage three reaction, on a hide is not fully understood at present. Although the chemical or physico-chemical mechanism of the fixation of my aminoplast complexes is not entirely clear, there is a strong presumption that the metallic element of said complexes forms a link between the reactive group of the hide and the higher polymer forms of the aminoplast bases thus producing a strong bondage with the hide substance as evidenced by high shrink temperatures and high water resistance.

More specifically, the aminoplast resin complexes of the present invention are prepared in the following manner: In the first stage, dicyandiamide is reacted with a water soluble carboxylic acid of the type illustrated by aliphatic carboxylic acids having no more than four carbon atoms and aromatic carboxylic acids containing at least one water solubilizing sulfo group. Examples of the aliphatic carboxylic acids which may be used are formic acid, acetic acid, propionic acid, hydroxy acetic acid and diglycolic acid. Typical aromatic acids which may be used are sulfo benzoic acid, mono sodium sulfo benzoic acid, sulfo toluic acid, mono sodium sulfo toluic acid, sulfo phenyl acetic acid, mono sodium sulfo phenyl acetic acid, sulfo derivatives of naphthoic acid, such as sulfo naphthoic acid, mono sodium sulfo naphthoic acid, and homologous naphthalene carboxylic acid and polycarboxylic acids such as sulfo naphthalic and mono sodium sulfo naphthalic acid.

Preferably, the reaction is carried out in the presence of water as a diluent. Generally, the water is from one to five times the weight of the acid but in some cases wherein the reaction is in a concentrated form, the water content is as low as 1/10 of the weight of the acid. The ratio of dicyandiamide to the water soluble acid is generally in the molar range of 1:½ to 1:4 and preferably in the range of 1:1 to 1:2. The reactants are gradually heated to a temperature between 70–80° C. and in most cases the reaction is exothermic so that the temperature rises to 100° to 160° C. The temperature at which the reactants are heated and the time of heating will depend upon whether the reactants have been diluted with a substantial amount of water or are in a substantially concentrated form.

If the reactants are diluted with a substantial amount of water, such as where the weight of the water equals that of the acid, the reactants are heated and refluxed for about 2 to about 5 hours, preferably about 3 hours, at a temperature in the range of 105° C. to 110° C. On the other hand, if the reactants are in a substantially concentrated form two different types of temperature and time conditions may be used. In the first type wherein the ratio of dicyandiamide to the water soluble acid is in the range of 1:1 to 1:4, the reaction, after it has been cooled down from the temperature in the range of 130° to 160° C., produced by the exothermic reaction of the reactants, proceeds at a temperature in the range of 70°–80° C. for a short period of time, usually between twenty to thirty minutes producing a solid material which is the resulting product of this first stage. In the second type of reaction, the same conditions are used to produce the solid material as described above but the reaction is extended in that the solid material is further heated for about 2 to 5 hours, preferably 3, at a temperature in the range of 110° to 120° C. to complete the first stage.

In the above first stage, the reactants are continuously stirred during the time period for the reaction. Also, the reactants in stages two and three as hereinafter described in detail are also continuously stirred during the period of time during which the reaction proceeds.

In the second stage of my process, the resulting product of stage one is reacted with formaldehyde or a formaldehyde liberating material such as paraformaldehyde and hexamethylenetetramine. This reaction proceeds for a period of time in the range of 2 to 5 hours, preferably 3, at a temperature in the range of 80° to 100° C., preferably 95° C. The amount of formaldehyde used in this reaction, based on the amount of dicyandiamide used in stage 1, is generally in the range of 2 to 5 moles, preferably 3, of formaldehyde per mole of dicyandiamide. The reaction in stage two is carried out in the presence of water, the water being in the general range of at least twice the amount of the weight of the formaldehyde content based on 100% formaldehyde. If the reaction in stage 1 is carried out under dilute conditions or if the formaldehyde is in dilute form, it may not be necessary to add any water to the mixture in stage 2 for the reaction to proceed.

In the third or final stage, the resulting product formed in stage 2 is reacted with a water soluble polyvalent metal salt of an organic or mineral acid. Examples of such salts are basic aluminum acetate, an aluminum acetate having the formul $Al(OH)_2(CH_3COO)\cdot \frac{1}{3}H_3BO_3$, aluminum formo acetate having the formula $$Al(OH)(OOCH)(OOCCH_3)$$

aluminum formate, basic chrome sulfate, chrome sulfate, chrome alum $(Cr_2(SO_4)_3K_2SO_4\cdot 24H_2O)$, zirconium sulfate, basic zirconium sulfate, zirconium chloride, basic zirconium chloride, zirconium acetate, copper acetate, copper sulfate, copper chloride, iron formate, iron sulfate, iron chloride, zinc acetate, zinc chloride, zinc sulfate and zinc formate.

The amount of the heavy metal salt used, based on the amount of dicyandiamide used in stage one, is in the range of 0.5 to 1 mole, preferably 0.6 to 0.75 mole per mole of dicyandiamide.

When the polyvalent metal salt is of the chrome or aluminum type the reaction is carried out at a temperature in the range of 80° C. to 100° C., preferably 95° C., for a period of time in the range of 2 to 5 hours, preferably 3. If a zirconium, copper, iron or zinc salt is used, however, the reaction should proceed at a temperature not higher than 50° C., for a period of 1 to 2 hours, preferably 1 hour, due to the high degree of hydrolysis effect on the zirconium, copper, iron or zinc salt.

As pointed out, hereinbefore, it is preferred that prior to the reaction in stage three that the resulting product of stage two be reacted with a water soluble sulfo compound of the type illustrated by water soluble metal salts of substituted alkyl sulfonates such as the alkanol sulfonates or alkylamine sulfonates, as well as compounds which when reacted with a methylol group form alkanol amines wherein one hydrogen of said amine has been replaced by a sulfo group. Examples of these compounds are the sodium salt of hydroxy methane sulfonic acid (this compound may be prepared by reacting formaldehyde and sodium bisulfite), sodium isethionate, sodium salt of hydroxy propane sulfonic acid, sodium sulfamate, the sodium salt of hydroxy butane sulfonic acid, the sodium salt of high molecular weight alkanol sulfonic acid containing ether and esters radicals such as compounds having the formulae

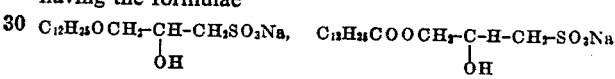

and sodium methyl tauride

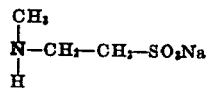

In place of the sodium salts, other water soluble salts such as the potassium and ammonium salts may be used.

The reaction of the resulting product of stage two with a sulfo compound of the type above illustrated, is generally carried out at a temperature in the range of 80° to 100° C., preferably 95° C., for a period of time in the range of 2 to 5 hours, preferably 3 hours.

The amount of the sulfo compound used, based on the amount of dicyandiamide used in stage one, is generally in the range of 1 to 2 moles, preferably one mole per mole of dicyandiamide.

The resulting product from this reaction is then reacted with a polyvalent metal salt in the final stage under the same conditions previously described for the third or final stage. The resulting aminoplast complex produced will not only have cation active properties as is the case wherein no sulfo compound is reacted with the product of stage two, but will also have anion active properties.

It should be realized that various modification may be made by one skilled in the art and still be within the scope of the present invention. For example, a polyvalent metal salt containing an appropriate acidic group may be mixed with the dicyandiamide prior to the formaldehyde reaction and without the necessity of a separate water soluble acid being added. Even in this case, however, the stages of the reactions are the same as hereinbefore described although the method of adding the active ingredients may be different. In this particular case, the dicyandiamide reacts with the acid group of the polyvalent metal salt, the formaldehyde reacts with this resulting product and the metal of the salt attaches to the functional groups of the resulting product from the formaldehyde reaction.

In a situation wherein the formaldehyde component is a formaldehyde liberating material such as hexamethylene tetramine, the water soluble acid which reacts with the dicyandiamide may also provide the acidic environment to liberate the formaldehyde from the hexamethylenetetramine. Again however, the reaction proceeds in the three steps as hereinbefore described.

In order to illustrate the preparation of modified aminoplast resin complexes in accordance with the present invention, Examples I to XXII are now given.

Example I 168 grams of dicyandiamide, 102 grams of formic acid (90%) are mixed with 102 grams of water in a flask equipped with a condenser. The mixture is gradually heated until an exothermic reaction takes place at 75° C. and the heating is then discontinued, the heat from the exothermic reaction raising the temperature to 108° C.

The mixture is then heated and refluxed for three hours at 110° C., the pH of a 5% solution of the resulting product at the end of three hours heating being 6.95.

486 grams of formaldehyde (37%) are then added to the above resulting product and the mixture is then heated and refluxed for three hours at 95° C. The pH of a 5% solution of the resulting product in this stage is 5.05.

186 grams of aluminum acetate niacet having the formula $Al(OH)_2(CH_3COO) \cdot \frac{1}{3} H_3BO_3$ are added to the above resulting product and the heating is continued and the mixture is refluxed for three hours at 95° C., giving a modified aminoplast resin complex of which a 5% solution has a pH of 5.2. A raw hide treated with a bath containing this complex as a tanning agent has a shrink temperature of 96° C.

Example II 168 grams of dicyandiamide, 204 grams of formic acid (90%) are mixed with 204 grams of water in a flask equipped with a condenser. The mixture is gradually heated until an exothermic reaction takes place at 75° C. and the heating is then discontinued, the heat from the exothermic reaction raising the temperature to between 104° C. to 110° C.

The mixture is then heated and refluxed for three hours at 110° C., the pH of a 5% solution of the resulting product at the end of three hours heating being 4.45.

486 grams of formaldehyde (37%) are then added to the above resulting product and the mixture is then heated and refluxed for three hours at 95° C. The pH of a 5% solution of the resulting product in this stage is 4.85.

189 grams of aluminum acetate having the formula $Al(OH)_2(CH_3COO) \cdot \frac{1}{3} H_3BO_3$ are added to the above resulting product and the heating is continued and the mixture is refluxed for three hours at 95° C., giving a modified aminoplast resin complex of which a 5% solution has a pH of 5.4. A raw hide treated with a bath containing this complex as a tanning agent has a shrink temperature of 94° C.

Example III 168 grams of dicyandiamide, 306 grams of formic acid (90%) are mixed with 200 grams of water in a flask equipped with a condenser. The mixture is gradually heated until an exothermic reaction takes place at 75° C. and the heating is then discontinued the heat from the exothermic reaction raising the temperature to between 104° C. to 110° C.

The mixture is then heated and refluxed for three hours at 110° C., the pH of a 5% solution of the resulting product at the end of the three hours being 4.1.

486 grams of formaldehyde (37%) are then added to the above resulting product and the mixture is then heated and refluxed for three hours at 95° C.

189 grams of aluminum acetate having the formula $Al(OH)_2(CH_3COO) \cdot \frac{1}{3} H_3BO_3$ are added to the above resulting product and the heating is continued and the mixture is refluxed for three hours at 95° C., giving a modified aminoplast resin complex of which a 5% solution has a pH of 5.2. A raw hide treated with a bath containing this complex as a tanning agent has a shrink temperature of 89° C.

Example IV 168 grams of dicyandiamide, 408 grams of formic acid (90%) are mixed with 200 grams of water in a flask equipped with a condenser. The mixture is gradually heated until an exothermic reaction takes place at 75° C. and the heating is then discontinued, the heat from the exothermic reaction raising the temperature to 104° C.

The mixture is then heated and refluxed for three hours at 105° C., the pH of a 5% solution of the resulting product at the end of the three hours heating being 4.1.

486 grams of formaldehyde (37%) are then added to the above resulting product and the mixture is then heated and refluxed for three hours at 95° C. The pH of a 5% solution of the resulting product of this stage is 4.35.

189 grams of aluminum acetate having the formula $Al(OH)_2(CH_3COO) \cdot \frac{1}{3} H_3BO_3$ are added to the above resulting product and the heating is continued and the mixture is refluxed for three hours at 95° C., giving a modified aminoplast complex of which a 5% solution has a pH of 5.25. A raw hide treated with a bath containing this complex as a tanning agent has a shrink temperature of 85° C.

Example V 168 grams of dicyandiamide, 102 grams of formic acid (90%) are mixed with 102 grams of water in a flask equipped with a condenser. The mixture is gradually heated until an exothermic reaction takes place at 70° C. and the heating is then discontinued, the heat from the exothermic reaction raising the temperature to 108° C. The mixture is then heated and refluxed for three hours at 108° C.

To the above resulting product is added 300 cc. of water and 180 grams of paraformaldehyde and the mixture is heated and refluxed for three hours at 95° C.

189 grams of aluminum acetate having the formula $Al(OH)_2(CH_3COO) \cdot \frac{1}{3} H_3BO_3$ are then added to the above resulting product and the mixture is heated and refluxed for three hours at 95° C., to give a modified aminoplast complex of which a 5% solution has a pH of 5.6. A raw hide treated with a bath containing this complex as a tanning agent has a shrink temperature of 93° C.

Example VI 168 grams of dicyandiamide are mixed with 102 grams of formic acid (90%) and the mixture is heated and refluxed in a flask equipped with a condenser to 100° C., at which an exothermic reaction starts and the temperature rises to 140° C.

The mixture is then cooled to 95° C. and 486 grams of formaldehyde (37%) are then added and the mixture is heated and refluxed for three hours at 95° C., the pH of a 5% solution of the resulting product being 5.6.

189 grams of aluminum acetate having the formula $Al(OH)_2(CH_3COO) \cdot \frac{1}{3} H_3BO_3$ are then added to the above resulting product and the mixture is heated and refluxed for three hours at 95° C., giving a modified aminoplast complex of which a 5% solution has a pH of 5.05. A raw hide treated with a bath containing this complex as a tanning agent has a shrink temperature of 96° C.

Example VII 168 grams of dicyandiamide and 204 grams of formic acid (90%) are mixed together in a flask equipped with a condenser. The mixture is gradually heated to 75° C. at which an exothermic reaction starts and the temperature gradually rises to 165° C. The mixture is then cooled to 95° C.

486 grams of formaldehyde (37%) are then added to the above resulting product and the mixture is heated and refluxed for three hours at 95° C., the pH of a 5% solution of the resulting product being 5.2.

189 grams of aluminum acetate having the formula Al(OH)$_2$(CH$_3$COO)·⅓H$_3$BO$_3$ are added to the above resulting product and the mixture is heated and refluxed for 3 hours at 95° C., giving a modified aminoplast complex of which a 5% solution has a pH of 5.2. A raw hide treated with a bath containing this complex as a tanning agent has a shrink temperature of 97° C.

Example VIII 168 grams of dicyandiamide are mixed with 306 grams of formic acid (90%) in a flask equipped with a condenser and are gradually heated until the temperature reaches 75° C. where an exothermic reaction starts raising the temperature to 140° C.

After the reaction is completed, the resulting product is cooled down to 95° C. and 486 grams of formaldehyde (37%) are then added to the resulting product and the mixture is heated and refluxed for 3 hours at 95° C.

189 grams of aluminum acetate having the formula Al(OH)$_2$(CH$_3$COO)·⅓H$_3$BO$_3$ are then added to the resulting product and the mixture is heated and refluxed for three hours at 95° C., giving a modified aminoplast complex of which a 5% solution has a pH of 5.0. The raw hide treated with a bath containing this complex as a tanning agent has a shrink temperature of 91° C.

Example IX 168 grams of dicyandiamide and 408 grams of formic acid (90%) are mixed in a flask equipped with a condenser. The mixture is heated and refluxed until the temperature reaches 60° C., at which temperature an exothermic reaction takes place raising the temperature to 135° C. The mixture is then cooled and is then heated and refluxed for three hours at 115° C., the pH of a 5% solution of the resulting product being 4.45.

486 grams of formaldehyde (37%) are then added to the above resulting product and the mixture is heated and refluxed for three hours at 95° C. The pH of a 5% solution of the resulting product being 4.62.

189 grams of aluminum acetate having the formula Al(OH)$_2$(CH$_3$COO)·⅓H$_3$BO$_3$ are then added to the above resulting product and the mixture is heated and refluxed for three hours at 95° C., giving a modified aminoplast complex of which a 5% solution has a pH of 4.9. A raw hide treated with a bath containing this complex as a tanning agent has a shrink temperature of 96° C.

Example X 168 grams of dicyandiamide, 102 grams of formic acid (90%) are mixed with 102 grams of water in a flask equipped with a condenser and the mixture is heated and refluxed to a temperature of 70° C., at which temperature an exothermic reaction starts raising the temperature to 108° C.

A mixture of 208 grams of sodium bisulphite and 150 cc. of formaldehyde (37%) are added. Then 300 cc. of water and 450 cc. of formaldehyde (37%) are added and the mixture is heated and refluxed for three hours at 95° C.

189 grams of aluminum acetate having the formula Al(OH)$_2$(CH$_3$COO)·⅓H$_3$BO$_3$ are then added to the above resulting product and the mixture is then heated and refluxed for three hours at 95° C., giving a modified aminoplast complex of which a 5% solution gives a pH of 5.6. A raw hide treated with a bath containing this complex as a tanning agent has a shrink temperature of 93° C.

Example XI 168 grams of dicyandiamide, 102 grams of formic acid (90%) are mixed with 102 grams of water in a flask equipped with a condenser. The mixture is gradually heated until the temperature reaches 70° C., at which temperature an exothermic reaction takes place raising the temperature to 108° C. The resulting mixture is then heated and refluxed for three hours at 110° C., the pH of a 5% solution of the resulting product being 6.95.

The resulting product is then cooled down to 80° C., and then 486 grams of formaldehyde (37%) are added and the mixture is heated and refluxed for three hours at 95° C. The pH of a 5% solution of the resulting product being 5.2.

To the above resulting product are added 194 grams of sulfamic acid, 200 grams of water and 226 grams of sodium hydroxide (40% Be). 150 cc. of formaldehyde (37%) are added and the mixture is heated and refluxed for three hours at 95° C., the pH of a 5% solution of the resulting product being 5.9.

189 grams of aluminum acetate having the formula Al(OH)$_2$(CH$_3$COO)·⅓H$_3$BO$_3$ are added to the above resulting product and the mixture is heated and refluxed for three hours at 95° C., giving a modified aminoplast complex of which a 5% solution has a pH of 5.9. A raw hide treated with a bath containing this complex as a tanning agent has a shrink temperature of 90° C.

Example XII 122.5 grams of sulphonated phthalic acid, 200 cc. of water, 12 grams of NaOH (40% Be) and 84 grams of dicyandiamide are mixed in a flask equipped with a condenser and the mixture is heated and refluxed at 100° C. for three hours, the pH of a 5% solution of the resulting product being 5.1.

243 grams of formaldehyde (37%) are added to the above resulting product and the mixture is heated and refluxed for three hours at 100° C.

To the above resulting product are added 140 grams of aluminum acetate having the formula

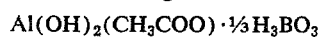

Al(OH)$_2$(CH$_3$COO)·⅓H$_3$BO$_3$ and 300 cc. of water. The mixture is heated and refluxed for two hours at 95° C. to give a modified aminoplast complex of which a 5% solution has a pH of 5.3. A raw hide treated with a bath containing this complex as a tanning agent has a shrink temperature of 95° C.

Example XIII 260 grams of the mono sodium salt of sulfobenzoic acid, 84 grams of dicyandiamide and 200 grams of water are mixed in a flask equipped with a condenser and the mixture is heated to 109° C. The mixture is then heated and refluxed for three hours at 109° C. and the resulting product is then cooled to 80° C.

324 grams of formaldehyde (37%) are then added to the above resulting product and the mixture is heated and refluxed at 95° C. for three hours.

140 grams of aluminum acetate having the formula Al(OH)$_2$(CH$_3$COO)·⅓H$_3$BO$_3$ and 300 cc. of water are added to the above resulting product and the mixture is then heated for two hours, giving a modified aminoplast complex of which a 5% solution has a pH of 5.55. A raw hide treated with a bath containing this complex as a tanning agent has a shrink temperature of 100° C.

Example XIV 168 grams of dicyandiamide, 225 grams of lactic acid (80%) and 200 grams of water are mixed in a flask equipped with a condenser and heated to 82° C. at which temperature an exothermic reaction starts raising the temperature to 103° C.

The mixture is heated and refluxed for three hours at 102° C., the pH of a 5% solution of the resulting product being 5.9. 486 grams of formaldehyde 37% are then added to the above resulting product and the mixture is heated and refluxed for three hours at 95° C.

189 grams of an aluminum acetate having the formula $Al(OH)_2(CH_3COO) \cdot 1/3 H_3BO_3$ are added to the above product and this mixture is heated for three hours at 95° C., giving a modified aminoplast complex of which a 5% solution has a pH of 5.3. A raw hide treated with a bath containing this complex as a tanning agent has a shrink temperature of 88° C.

Example XV 168 grams of dicyandiamide, 218 grams of hydroxy acetic acid (70%) and 200 grams of water are mixed in a flask equipped with a condenser and the mixture is heated and refluxed to 80° C. at which temperature an exothermic reaction starts, raising the temperature to 103° C. The mixture is heated and refluxed for three hours at 103° C., the pH of a 5% solution of the resulting product being 5.9.

486 grams of formaldehyde (37%) are added to the above resulting product and the mixture is heated and refluxed for three hours at 95° C., the pH of the 5% solution of the resulting product being 4.6.

189 grams of aluminum acetate having the formula $Al(OH)_2(CH_3COO) \cdot 1/3 H_3BO_3$ are added to the above resulting product and the mixture is heated for three hours at 95° C., giving a modified aminoplast complex of which a 5% solution has a pH of 5.35. A raw hide treated with a bath containing this complex as a tanning agent has a shrink temperature of 82° C.

Example XVI 168 grams of dicyandiamide, 306 grams of formic acid (90%) are mixed together in a flask equipped with a condenser and the mixture is heated to 70° C., at which temperature an exothermic reaction starts raising the temperature to 147° C. the mixture is cooled and is heated and refluxed for three hours at 115° C., the pH of a 5% solution after three hours heating being 5.6.

486 grams of formaldehyde (37%) are added to the above resulting product and the mixture is heated and refluxed for three hours at 95° C., the pH of a 5% solution of the resulting product being 5.0.

189 grams of an aluminum acetate having the formula $Al(OH)_2(CH_3COO) \cdot 1/3 H_3BO_3$ are added to the above resulting product and the mixture is heated and refluxed for three hours at 95° C., giving a modified aminoplast complex of which a 5% solution has a pH of 5.3. A raw hide treated with a bath containing this complex as a tanning agent has a shrink temperature of 91° C.

Example XVII 168 grams of dicyandiamide, 500 grams of water, 189 grams of an aluminum acetate having the formula $Al(OH)_2(CH_3COO) \cdot 1/3 H_3BO_3$ and 102 grams of formic acid (90%) are heated together in a flask equipped with a condenser, the temperature being brought up to 70° C. The mixture is heated and refluxed for three hours at 97° C., the pH of a 5% solution of the resulting product being 5.45.

120 grams of paraformaldehyde and 162 grams of formaldehyde (37%) are then added to the above resulting product and this mixture is heated and refluxed for three hours at 95° C., giving a modified aminoplast complex of which a 5% solution has a pH of 5.45. A raw hide treated with a bath containing this complex as a tanning agent has a shrink temperature of 97° C.

Example XVIII 168 grams of dicyandiamide, 500 grams of water, 246 grams of basic chrome sulfate and 102 grams of formic acid (90%) are heated together in a flask equipped with a condenser. The temperature is brought to 70° C. The mixture is heated and refluxed for three hours at 100° C., the pH of a 5% solution of the resulting product being 5.1.

486 grams of formaldehyde (37%) are then added to the above product and the mixture is heated and refluxed for three hours at 95° C., giving a modified aminoplast complex of which a 5% solution has a pH of 4.5. A raw hide treated with a bath containing this complex as a tanning agent has a shrink temperature of 100° C.

Example XIX 84 grams of dicyandiamide, 51 grams of formic acid (90%) and 51 grams of water are mixed in a flask equipped with a condenser and are heated and refluxed to 70° C. at which temperature an exothermic reaction starts raising the temperature to 108° C. The mixture is then heated and refluxed for three hours at 110° C.

To the above resulting product are added 104 grams of sodium bisulphite and 81 grams of formaldehyde (37%). 243 grams of formaldehyde (37%) are then added and the mixture is then heated and refluxed for three hours at 95° C. The resulting product is then cooled at 50° C.

To the above resulting product is added 119 grams of cupric acetate and the mixture is heated and refluxed for 2 hours at 50° C. giving a modified aminoplast complex of which a 5% solution has a pH of 5.2. A raw hide treated with a bath containing this complex as a tanning agent has a shrink temperature of 83° C.

Example XX 84 grams of dicyandiamide, 51 grams of formic acid (90%) and 51 grams of water are mixed in a flask equipped with a condenser. The mixture is heated to 70° C. at which temperature an exothermic reaction starts raising the temperature to 108° C. This mixture is then heated and refluxed for three hours at 110° C.

To the above resulting product is added 243 grams of formaldehyde (37%) and the mixture is heated and refluxed for three hours at 95° C.

A mixture of 104 grams of bisulphite of soda and 81 grams of formaldehyde (37%) are added to the above product and after the reaction starts 150 cc. of water are added. The mixture is then heated for two hours at 95° C. To the above resulting product is added 110 grams of zinc acetate and 200 grams of water and the mixture is heated for two hours at 50° C., giving a modified aminoplast complex of which a 5% solution has a pH of 6.4. A raw hide treated with a bath containing this complex as a tanning agent has a shrink temperature of 76° C.

Example XXI 168 grams of dicyandiamide, 500 grams of water, 189 grams of an aluminum acetate having the formula $Al(OH)_2(CH_3COO)1/3 \cdot H_3BO_3$ and 102 grams of formic acid (90%) are mixed in a flask equipped with a condenser. The mixture is then heated and refluxed for three hours at 100° C. The pH of a 5% solution of the resulting product being 5.45.

To the above resulting product is added 120 grams of paraformaldehyde, 162 grams of formaldehyde (37%) and the mixture is heated and refluxed for three hours at 95° C. The pH of a 5% solution of the resulting product is 5.45. The resulting product is then cooled to 50° C.

To this resulting product is added 104 grams of iron-formate. The mixture is heated and refluxed for two hours at 50° C., giving a modified aminoplast complex of which a 5% solution has a pH of 4.6. A raw hide treated with a bath containing this complex as a tanning agent has a shrink temperature of 90° C.

Example XXII 168 grams of dicyandiamide, 500 grams of water, 189 grams of an aluminum acetate having the formula $Al(OH)_2(CH_3COO) \cdot 1/3 H_3BO_3$ and 102 grams of formic acid (90%) are mixed in a flask equipped with a condenser. The mixture is heated and refluxed for three hours at 100° C. The pH of a 5% solution of the resulting product being 5.45.

To the above resulting product are added 120 grams of paraformaldehyde and 162 grams of formaldehyde (37%). The mixture is heated and refluxed for three hours at 95° C. The pH of a 5% solution of the resulting product is 5.45. The product is then cooled to 50° C.

To the above resulting product is added 177 grams of zirconium sulfate. The mixture is heated and refluxed for two hours at 150° C., giving a modified aminoplast complex of which a 5% solution has a pH of 4.2. A raw hide treated with a bath containing this complex as a tanning agent has a shrink temperature of 93° C.

In order to illustrate the application of the modified aminoplast resin complexes of the present invention, Examples XXIII—XXIX are now given. The modified aminoplast complex as prepared in accordance with Example I is used as a typical example to illustrate the application of the complexes of this invention. In using these complexes as a tanning and retanning agent the pH of a bath containing a complex should preferably be within the range of 5 to 6.5. If the pH is above 6.5, there appears to be a detanning effect produced which interferes with and is detrimental to the action of complexes as tannages. If the pH of the bath is maintained between the above referred to preferred range, the fixation of a complex to the hide is more complete than if the pH were above or below this range.

Example XXIII

This example is used to illustrate the combination of the modified aminoplast complexes of the present invention with chrome tanning salts, the complex being used as a pretanning agent. 100 pounds of pickled calfskin is added to a water bath in a tumbler, said water bath containing 100 pounds of water, 3 pounds of salt and 20 pounds of a modified aminoplast complex prepared in accordance with Example I. The stock is run in the bath for two hours. 3 pounds of a basic chrome sulfate (24% $Cr_2O_3$) and 10 pounds of water are then added to the bath and the stock is run in the bath for one hour. Three pounds of basic chrome sulfate (24% $Cr_2O_3$) and 10 pounds of water are then added to the bath and the stock is run in the bath for three hours. One pound of bicarbonate of soda is added to the bath along with 20 pounds of water and the stock is run in the bath for one hour, the pH of the bath at this point being 5. The stock is left in the tan liquor overnight. The next day the stock is run in the bath for one hour and is then horsed up.

Example XXIV

This example illustrates the use of modified aminoplast complexes in producing a white tannage. One hundred pounds of pickled calfskin is added to a bath in a tumbler, said bath containing 100 pounds of water, 3 pounds of salt and 20 pounds of modified aminoplast complex prepared in accordance with Example I. The stock is run in the bath for 3 hours. 20 more pounds of a modified aminoplast complex prepared in accordance with Example I are added to the bath along with 30 pounds of water. The stock is then run in the bath for 5 hours and is permitted to remain in the bath overnight. The next day the stock is run in the bath for 2 more hours and is then horsed up.

By using the above process with the addition of 5 to 10% magnesium sulfate a softer leather is obtained. Also, the addition of 2 to 3 pounds of sodium acetate and 5 pounds of magnesium sulfate will produce a mellow soft tannage. In place of sodium acetate sodium formate may be used.

Example XXV

This example illustrates the use of modified aminoplast resin complexes as a direct tannage. One hundred pounds of pickled calfskin are added to a water bath in a tumbler, said water bath containing 100 pounds of water, 3 pounds of salt, 3 pounds of basic chrome sulfate (24% $Cr_2O_3$) and 12.5 pounds of a modified aminoplast complex prepared in accordance with Example I. The stock is run in the bath for two hours. Twenty pounds of water, 3 pounds of basic chrome sulfate (24% $Cr_2O_3$) and 10 pounds of modified aminoplast complex prepared in accordance with Example I are then added to the bath and the stock is run in the bath for 3 hours. One pound of borax and 20 pounds of water are then added to the bath. The stock is run in the bath for 1 hour, the pH of the bath at this point being 5. The stock is left in the tan liquor overnight. The next day the stock is run in the bath for 1 hour and is then horsed up.

Example XXVI

This example illustrates the use of modified aminoplast complexes of this invention as a retanning agent in the chrome tannage method. One hundred pounds of pickled calfskin are added to a water bath in a tumbler, said water bath containing 100 pounds of water, 3 pounds of salt, 3 pounds of basic chrome sulfate (24% $Cr_2O_3$) and 12.5 pounds of a modified aminoplast complex prepared in accordance with Example I. The stock is run in the bath for two hours. Twenty pounds of water, 3 pounds of basic chrome sulfate (24% $Cr_2O_3$) and 10 pounds of modified aminoplast complex prepared in accordance with Example I are then added to the bath and the stock is run in the bath for 3 hours. One pound of borax and 20 pounds of water are then added to the bath. The stock is run in the bath for 1 hour, the pH of the bath at this point being 5. The stock is left in the tan liquor overnight. The next day the stock is run in the bath for 1 hour and is then horsed up.

Example XXVII

This example is given to illustrate the use of modified aminoplast complexes of the present invention to produce a white tannage on non-pickled calfskin stock. One hundred pounds of bated, drained stock are added to a water bath in a tumbler, said water bath containing 70 pounds of water, 3 pounds of salt, 3 pounds magnesium sulfate and 17.5 pounds of a modified aminoplast complex prepared in accordance with Example I. The stock is run in the bath for 2 hours. 17.5 pounds of water, 3 pounds of salt, 3 pounds of magnesium sulfate and 17.5 pounds of a modified aminoplast complex prepared in accordance with Example I are added to the bath and the stock is run in the bath for 3 hours.

The pH of the bath is then checked to see if the pH is above 6. If the pH is below 6, then it is adjusted to be preferably between pH 6 and 6.2 by the addition of borax and water. The stock is then run in a bath for three more hours. After this the pH is again checked to see that it is maintained above 6 as before, and, if necessary, a proper adjustment is made. The skins are then left in the bath overnight and the next day they are again run for 2 hours. The pH is again checked to see that it is above 6 and preferably between 6 and 6.2. In the above example other suitable pH adjusting compounds may be used in place of borax, such as disodium phosphate and bicarbonate of soda.

Example XXVIII

This example illustrates the use of modified aminoplast complexes of the present invention in producing a white tannage. One hundred pounds of pickled calfskin stock are added to a water bath in a tumbler, said water bath containing 70 pounds of water, 2 pounds of salt, 3 pounds of magnesium sulfate and 17.5 pounds of a modified aminoplast complex prepared in accordance with Example I. The stock is run in the bath for 2 hours. 20 pounds of water, 3 pounds of magnesium sulfate and 17.5 pounds of a modified aminoplast complex prepared in accordance with Example I are added to the bath. The stock is run in the bath for 2 hours.

Two pounds of borax and 5 pounds of water are then added to the bath and the stock is run in the bath for 1 hour. Again 2 pounds of borax and 5 pounds of water are added to the bath and the stock is run in the bath for 1 hour. At this point, the pH is checked to see that it is above 6 and if not it is so adjusted by the addition of borax and water so that the pH is preferably between 6 and 6.3. The stock is run in the bath for 2 hours and is permitted to lay overnight. The next day the stock is run in the bath for 1 hour and the pH is again checked to see that it is between 6 and 6.3.

*Example XXIX*

This example is given to illustrate the use of modified aminoplast complexes of the present invention in effectuating both a tanning and retanning effect. One hundred pounds of pickled calfskin stock are put into a water bath in a tumbler, said water bath containing 80 pounds of water, 3 pounds of salt, and 20 pounds of a modified aminoplast complex prepared in accordance with Example XVIII. The stock is run in the bath for one hour. 20 pounds of water and 20 pounds of a modified aminoplast complex prepared in accordance with Example XVIII are added to the bath and the stock is run in the bath for 2 hours. 20 pounds of water and 2 pounds of borax are added to the bath and the stock is run in the bath for 1 hour. Again 20 pounds of water and 2 pounds of borax are added to the bath and the stock is run in the bath for 2 hours, the pH at this point being 5.2. The skins are then permitted to lay in the bath overnight and the next day are run in the bath for ½ hour. The skins are then horsed up, put out, shaved, dyed and then finished.

The invention in its broader aspects is not limited to the specific processes and steps described but departures may be made therefrom within the scope of the accompanying claims without departing from the principles of the invention and without sacrificing its chief advantages.

I claim:

1. A process for the production of water-soluble modified aminoplast resin complex comprising reacting dicyandiamide with a water-soluble carboxylic acid at a temperature in the range of 70° C. to 120° C. for a time period in the range of ½ to 5 hours, the molar ratio between the dicyandiamide and the acid being in the range of 1:1 to 1:4, to form a first stage reaction product, mixing the first stage reaction product with formaldehyde in a molar ratio between 2 to 5 moles of formaldehyde per mole of dicyandiamide used in the first stage reaction and heat reacting the first stage reaction product with formaldehyde in the presence of water in a second stage reaction to form a second stage reaction product, and heat reacting the second stage reaction produce in a third stage reaction with a water-soluble salt selected from the group consisting of an aluminum acetate having the formula Al(OH)$_2$(CH$_3$COO).⅓H$_3$BO$_3$, aluminum formo acetate having the formula Al(OH)(OOCH)(OOCCH$_3$)

aluminum formate, basic chrome sulfate, chrome alum having the formula Cr$_2$(SO$_4$)$_3$K$_2$SO$_4$—24H$_2$), zirconium sulfate, basic zirconium sulfate, zirconium chloride, basic zirconium chloride, zirconium acetate, copper acetate, copper sulfate, copper chloride, iron formate, iron sulfate, iron chloride, zinc acetate, zinc chloride, zinc sulfate and zinc formate, the formaldehyde being added solely in the second stage reaction.

2. A process according to claim 1 wherein the water-soluble carboxylic acid is selected from the group consisting of formic acid, lactic acid, acetic acid, propionic acid, hydroxy acetic acid, diglycolic acid, sulfo benzoic acid, mono sodium sulfo benzoic acid, sulfo phenyl acetic acid, mono sodium sulfo phenyl acetic acid, sulfo toluic acid, mono sodium sulfo toluic acid, sulfo naphthoic acid, mono sodium sulfo naphthoic acid, sulfo naphthalic acid and mono sodium sulfo naphthalic acid.

3. A process according to claim 1 wherein the second stage reaction product is reacted with a sulfo containing compound prior to the third stage reaction in a molar ratio of from 1 to 2 moles of the sulfo containing compound per mole of dicyandiamide used in the first stage reaction, said sulfo compound being selected from the group consisting of the water-soluble salts of hydroxy methane sulfonic acid, water-soluble salts of hydroxy propane sulfonic acid, water-soluble sulfamates, water-soluble salts of hydroxy butane sulfonic acid, water-soluble methyl taurides, water-soluble salts of high molecular weight sulfonic acids having the formulae

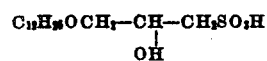

and

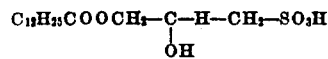

4. A process according to claim 1 wherein the reaction being carried out in the second stage reaction formaldehyde is reacted with the first stage product in the presence of water for a period of time in the range of 2 to 5 hours at a tmperature in the range of 80° to 100° C., the amount of water being at least twice that of the formaldehyde content based on 100% formaldehyde and, where, in the third stage reaction the metal salt is reacted with the second stage product for 1 to 5 hours at a temperature in the range of 50° C. to 100° C., the amount of metal salt being in the range of 0.5 to 1 mole per mole of dicyandiamide used in stage one.

5. A process as defined in claim 4 wherein the water-soluble acid is diluted with water whose weight equals at least that of the acid and the acid is reacted with dicyandiamide in the first stage reaction for 2 to 5 hours at temperature in the range of 105° C. to 110° C.

6. A process as defined in claim 4 wherein the water-soluble acid is in a substantially concentrated form and it is reacted with dicyandiamide in the first stage reaction for about ½ hour at a temperature in the range of 70° C. to 80° C.

7. A process as defined in claim 4 wherein the resulting product formed in stage one is further heated for 2 to 5 hours at a temperature in the range of 110° C. to 120° C.

8. A process as defined in claim 4 wherein the water-soluble carboxylic acid is formic acid.

9. A process according to claim 4 wherein the water-soluble carboxylic acid is mono sodium sulfo benzoic acid.

10. A process according to claim 4 wherein the metal salt is an aluminum acetate having the formula Al(OH)$_2$(CH$_3$COO).⅓H$_3$BO$_3$.

11. A process according to claim 4 wherein the metal salt is basic chrome sulfate.

12. A process according to claim 4 wherein the metal salt is basic zirconium sulfate.

13. A process according to claim 4 wherein the metal salt is iron sulfate.

14. A process according to claim 4 wherein the metal salt is aluminum formo acetate having the formula Al(OH)(OOCH)(OOCCH$_3$)

15. The water-soluble product made in accordance with the process of claim 1.

16. A modified water-soluble aminoplast resin complex made in accordance with the process of claim 3.

17. A modified water-soluble aminoplast resin complex made in accordance with the process of claim 4.

18. A modified water-soluble aminoplast resin complex made in accordance with the process of claim 8.

19. A modified water-soluble aminoplast resin complex made in accordance with the process of claim 9.

20. A modified water-soluble aminoplast resin complex made in accordance with the process of claim 10.

21. A modified water-soluble aminoplast resin complex made in accordance with the process of claim 11.

References Cited in the file of this patent

UNITED STATES PATENTS

| | | |
|---|---|---|
| 2,207,442 | Ripper | July 9, 1940 |
| 2,480,514 | Simons | Aug. 30, 1949 |
| 2,631,920 | Albrecht | Mar. 17, 1953 |

FOREIGN PATENTS

| | | |
|---|---|---|
| 314,358 | Great Britain | June 24, 1929 |